US008331929B2

(12) United States Patent
Brisebois et al.

(10) Patent No.: US 8,331,929 B2
(45) Date of Patent: Dec. 11, 2012

(54) MOBILITY-BASED RESELECTION SCAN SCHEDULING

(75) Inventors: Arthur Brisebois, Cumming, GA (US); Robert Taylor, Roswell, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 353 days.

(21) Appl. No.: 12/624,643

(22) Filed: Nov. 24, 2009

(65) Prior Publication Data

US 2011/0124334 A1 May 26, 2011

(51) Int. Cl.
H04W 4/00 (2009.01)
(52) U.S. Cl. ........................... 455/434; 370/334
(58) Field of Classification Search .... 455/414.1–414.4, 455/434, 456.1–456.5, 161.1, 560, 561.1; 370/331, 334
See application file for complete search history.

(56) References Cited

U.S. PATENT DOCUMENTS

| | | | |
|---|---|---|---|
| 6,314,308 B1 | 11/2001 | Sheynblat et al. | |
| 7,146,130 B2 | 12/2006 | Hsu et al. | |
| 7,400,600 B2 | 7/2008 | Mullany et al. | |
| 7,400,886 B2 | 7/2008 | Sahim et al. | |
| 7,440,755 B2 | 10/2008 | Balachandran | |
| 7,496,060 B2 | 2/2009 | Ramirez et al. | |
| 7,508,781 B2 | 3/2009 | Liu et al. | |
| 7,680,469 B2 | 3/2010 | Fry | |
| 7,924,787 B2 * | 4/2011 | Lee | 370/331 |
| 8,212,661 B2 * | 7/2012 | Shuster | 340/438 |
| 2007/0091847 A1 * | 4/2007 | Lee | 370/331 |
| 2007/0184835 A1 * | 8/2007 | Bitran et al. | 455/434 |
| 2009/0068970 A1 * | 3/2009 | Ahmed et al. | 455/161.1 |
| 2011/0070863 A1 * | 3/2011 | Ma et al. | 455/410 |
| 2012/0013504 A1 * | 1/2012 | Raento et al. | 342/357.29 |

OTHER PUBLICATIONS

Desh, "15 Cellphone chargers that harness kinetic energy for a clean recharge". Copyright Instablogs Network 2009. http://www.greendiary.com/entry/15-cellphone-chargers-that-harness-kinetic-energy-for-a-clean-recharge/ Last accessed Feb. 15, 2011, 10 pages.
Nicole Casal Moore, "Tiny Generators run on good vibrations". Copyright 2009-2011 Futurity.org. http://www.futurity.org/science-technology/tiny-generators-run-on-good-vibrations/ Last accessed Feb. 15, 2011, 5 pages.
Noel McKeegan, "Good vibrations: tiny generator harnesses kinetic energy to power wireless electrical systems". Copyright gizmag 2003-2011. http://www.gizmag.com/go/7584/ Last accessed Feb. 15, 2011, 4 pages.
S.P. Beeby, et al., "Kinetic Energy Harvesting". ACT Workshop on Innovative Concepts. ESA-ESTEC Jan. 28-29, 2008. http://www.esa.int/gsp/ACT/events/workshops/ACT-ART-Bridge2Space-Beeby.pdf Last accessed Feb. 15, 2011, 10 pages.
"Directory: Human-Powered". http://peswiki.com/index.php/Directory:Human-Powered Last accessed Feb. 15, 2011, 11 pages.
OA dated Mar. 22, 2012 for U.S Appl. No. 12/946,611, 22 pages.
OA dated Jun. 27, 2012 for U.S. Appl. No. 12/946,611, 20 pages.

* cited by examiner

Primary Examiner — Kamran Afshar
Assistant Examiner — Khawar Iqbal
(74) Attorney, Agent, or Firm — Turocy & Watson, LLP

(57) ABSTRACT

The disclosed subject matter relates to an architecture that can determine a scanning schedule for reselection scanning in connection with a wireless communication network or service. The architecture can monitor various indicia relating to recent movement of user equipment (UE) such as a wireless device, and, based upon such recent movement indicia, construct a mobility pattern for the UE. In addition, based upon the mobility pattern, the architecture can generate a reselection scanning schedule for the UE designed to optimize tradeoffs between battery life and network awareness.

20 Claims, 14 Drawing Sheets

MOBILITY-BASED RESELECTION SCAN SCHEDULING

TECHNICAL FIELD

The present application relates generally to wireless communications networks, and more specifically to utilizing a mobility pattern for user equipment (UE) for scheduling reselection scanning performed by the UE.

BACKGROUND

Modern wireless communication devices (e.g., user equipment (UE)) and networks must support more frequency bands and technologies than ever before. In order to benefit from all this available network bandwidth and capacity, each device must be aware of what is available while camping and/or before voice or data calls or other communication transactions are made. In complex multi-technology and frequency band scenarios, associated UE may scan, for example, 3 different technologies across 4 different frequency bands. Such can be especially important for device-driven network technology selection and display techniques. Moreover, lacking proactive information about available networks, smart network selection techniques are slow or otherwise less functional.

According to traditional network scanning techniques, devices periodically scan various frequency bands and technologies, then select and camp on the best one identified. Such scanning typically requires receiver and battery resources while the UE is otherwise idle. If scanning is too frequent, battery standby time is reduced. On the other hand, if scanning is too infrequent, the UE can lack real-time awareness of the surrounding networks and may make incorrect selection decisions. Either result is sub-optimal.

SUMMARY

The following presents a simplified summary of the disclosed subject matter in order to provide a basic understanding of some aspects of the disclosed subject matter. This summary is not an extensive overview of the disclosed subject matter. It is intended to neither identify key or critical elements of the disclosed subject matter nor delineate the scope of the disclosed subject matter. Its sole purpose is to present some concepts of the disclosed subject matter in a simplified form as a prelude to the more detailed description that is presented later.

The subject matter disclosed herein, in one aspect thereof, comprises an architecture that can determine a scanning schedule for reselection scanning in connection with a wireless communication network or service. In accordance therewith and to other related ends, the architecture can include a mobility component that can determine a current mobility pattern for user equipment (UE) associated with a wireless communication service or network. For example, the mobility pattern can be based upon a change in location for the UE or a speed or velocity for the UE. Additionally or alternatively, the mobility pattern can be constructed based upon an examination of a history of cell IDs selected by the UE during recent reselection scans, which can indicate or be representative of UE movement as well as the pattern of movement.

In addition, the architecture can include an assignment component that can determine a reselection scanning schedule for the UE based upon the mobility pattern. For instance, the assignment component can suggest a long interval between reselection scans when it is determined that the mobility pattern is stationary or substantially stationary, thus facilitating extended battery life due to fewer reselection scans performed by the UE. Similarly, the assignment component can recommend a medium interval when the mobility pattern indicates only low mobility or perhaps pseudo mobility in connection with the UE. Moreover, the assignment component can determine that a short interval is appropriate, e.g., when the mobility pattern suggests high mobility, thus potentially facilitating high network awareness or discovery capabilities.

The following description and the annexed drawings set forth in detail certain illustrative aspects of the disclosed subject matter. These aspects are indicative, however, of but a few of the various ways in which the principles of the disclosed subject matter may be employed and the disclosed subject matter is intended to include all such aspects and their equivalents. Other advantages and distinguishing features of the disclosed subject matter will become apparent from the following detailed description of the disclosed subject matter when considered in conjunction with the drawings.

DETAILED DESCRIPTION

Figure 1:
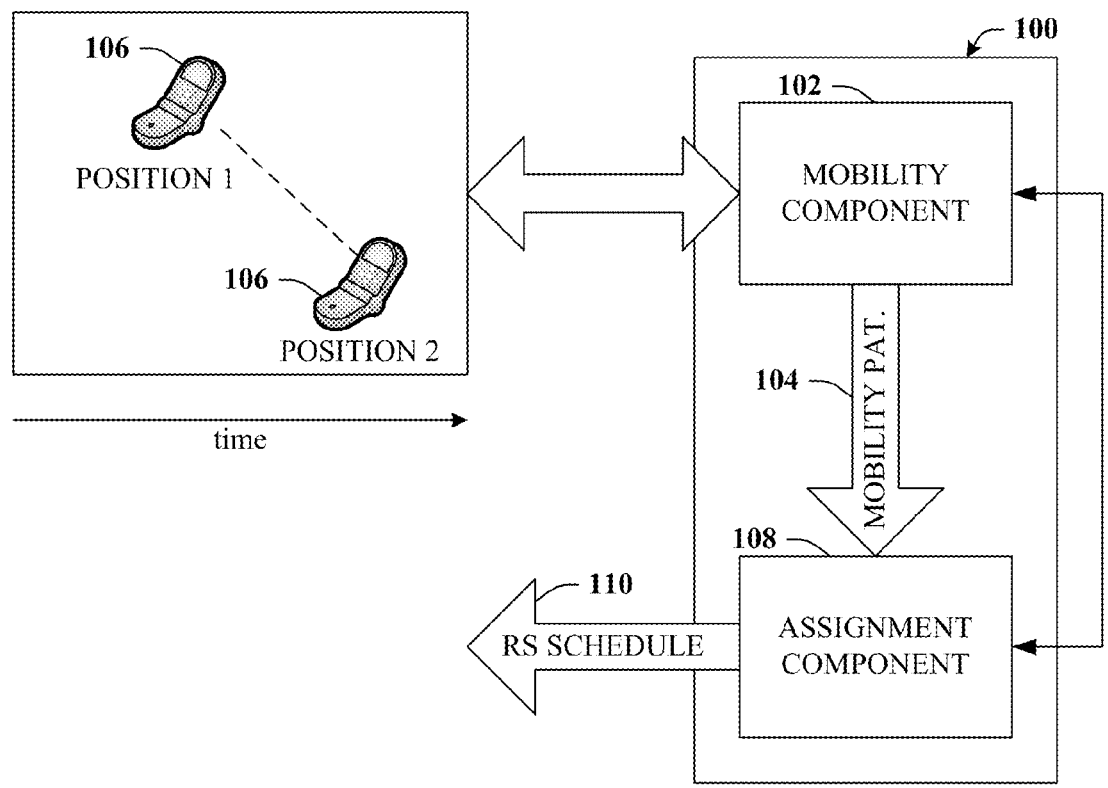
FIG. 1 is a block diagram of a system that can determine a scanning schedule for reselection scanning in connection with a wireless communication network or service.

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

As used in this application, the terms "system," "component," "interface," and the like are intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. An interface can include input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the disclosed subject matter.

As used herein, the terms "infer" or "inference" generally refer to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Further, terms like "user equipment," "mobile station," "mobile," subscriber station," "access terminal," "terminal," "handset," and similar terminology, generally refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "cell," "cell site," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Referring now to the drawing, with reference initially to FIG. 1, system 100 that can determine a scanning schedule for reselection scanning in connection with a wireless communication network or service is depicted. Generally, system 100 can include mobility component 102 that can determine current mobility pattern 104 for user equipment (UE) 106 associated with a wireless communication service or network. For example, a wireless communication network (not shown) with suitable equipment (e.g., a local base station, access terminal, cell, cell site or the like) can provide wireless communication service(s) for UE 106 (e.g., a mobile handset, cellular phone, personal digital assistant (PDA), smart phone . . . ). As depicted, UE 106 can change in terms of physical and/or geographical location over time, represented by UE 106 at position 1 and, some time later, at position 2. Thus, by examining the nature of (or lack of) movement over time of UE 106, mobility component 102 can construct current mobility pattern 104.

Accordingly, current mobility pattern 104 can represent all or a portion of a history of physical, geographical, or pseudo movement of UE 106 during a recent period of time. Physical or geographical movement can relate to a change in position or location of UE 106, whereas pseudo movement need not require any change in position or location of UE 106 (although such could be the case to some degree), but instead generally relates to a change in a local environment (e.g., weather), network parameters (e.g., power, sensitivity), or service (e.g., voice call vs. Internet query) such that UE 106 reselects a different cell or other network aspects to handle communication, even though UE 106 might be at the same location as a previously made communication.

In addition, system 100 can also include assignment component 108 that can determine reselection scanning schedule 110 for UE 106 based upon mobility pattern 104. Reselection scanning schedule 110 can, for example, be a schedule that defines, suggests, or recommends when or how often UE 106 should perform reselection scanning. Thus, given reselection scanning schedule 110 can be based upon current mobility pattern 104, the disclosed subject matter can effectuate speed- or movement-based network scanning for, e.g., multi-technology devices (e.g., UE 106). Speed-based scanning can be employed as a means to utilize idle mode speed detection capabilities to optimize radio technology scanning. Moreover, given that mobility of the device is a primary factor in the necessity to perform reselection scanning in conventional wireless networks, speed detection can be employed to determine if a UE should scan infrequently or frequently; thus, inter alia, potentially optimizing mobility performance and battery life.

For example, if the UE (e.g., UE 106) is stationary, surrounding frequency bands, technologies and sector carriers do not change much, if at all. In such a case, frequent scanning is unnecessary or potentially superfluous since there will typically be little to no change from the last reselection scan. If, on the other hand, the UE is moving, surrounding frequency bands, technologies, and/or sector carriers may change quite a bit. In this latter case, more frequent scanning may be beneficial in order to support proper network selection by the UE. The subject matter disclosed herein describes a number of example speed detection mechanisms, however, it should be appreciated that other mechanisms can be employed either in lieu of other methods or in combination with those other methods, such as to aid, refine, or identify a change in speed or position.

It should be appreciated that 3GPP TS 25.304 5.2.6.1.2 defines speed-dependent UE measurement rules as well as reselection behavior for UE. Unfortunately these specifications determine "if" a neighboring sector carrier or technology are measured, but these specifications do not address "how often" these measurements should occur. Moreover, these specifications also do not differentiate between repetitive and non-repetitive reselection behavior before determining if the UE is in the high or low mobility state. Accordingly, numerous improvements can be provided, which is further detailed herein.

In particular, the above-mentioned specification provides that as the UE moves between sector carriers of any technology, the UE will read an associated System Information Broadcasts, specifically looking for cell ID. This cell ID will change as the UE moves between sector carriers. Thus, if the cell ID changes many times within a pre-defined time interval (defined as $N_{CR}$ (Number of cell reselections) in 3GPP), the UE is considered moving. If the cell ID does not change at all within a pre-defined time interval, the UE is considered—stationary. Accordingly, as will be seen, the disclosed form of speed detection is already supported by 3GPP TS 25.304 5.2.6.1.2 along with other capabilities for Hierarchical Cell Structures. Specifically, 3GPP only considers the number of cell ID changes without checking to determine if the changes in cell ID are between the same set of cell (e.g., repetitive, discussed infra). Hence, 3GPP does not contemplate employing cell ID patterns or the like in order to construct a schedule for reselection scanning such as reselection scanning schedule 110. Moreover, 3GPP does not contemplate cell ID patters (e.g., repetitive or unique) for defining mobility and/or distinguishing between high, low, or other types of mobility designations.

Figure 2A:
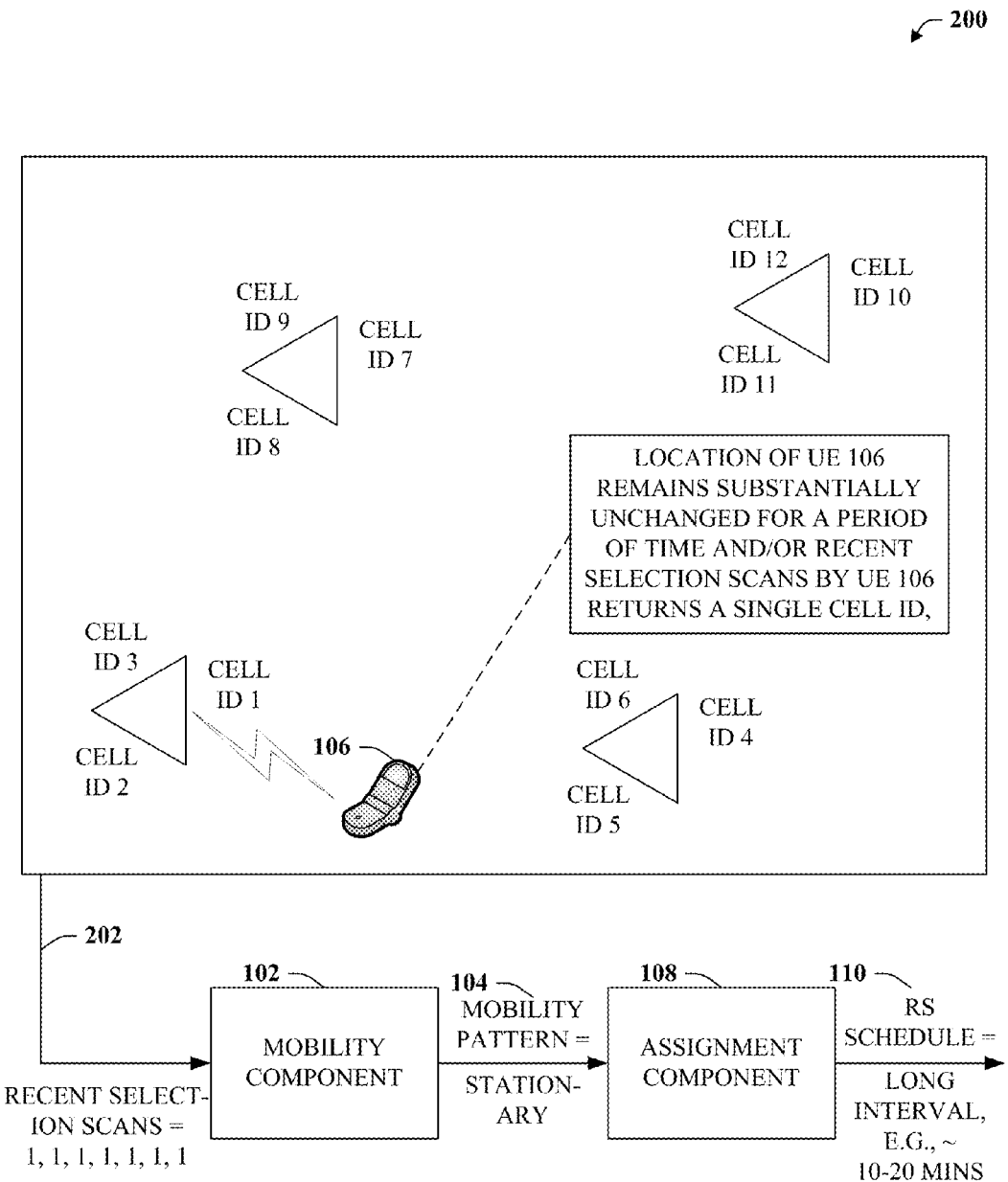
FIG. 2A depicts a block diagram of a system that illustrates an example of processing when a UE is in a stationary state.
Figure 2B:
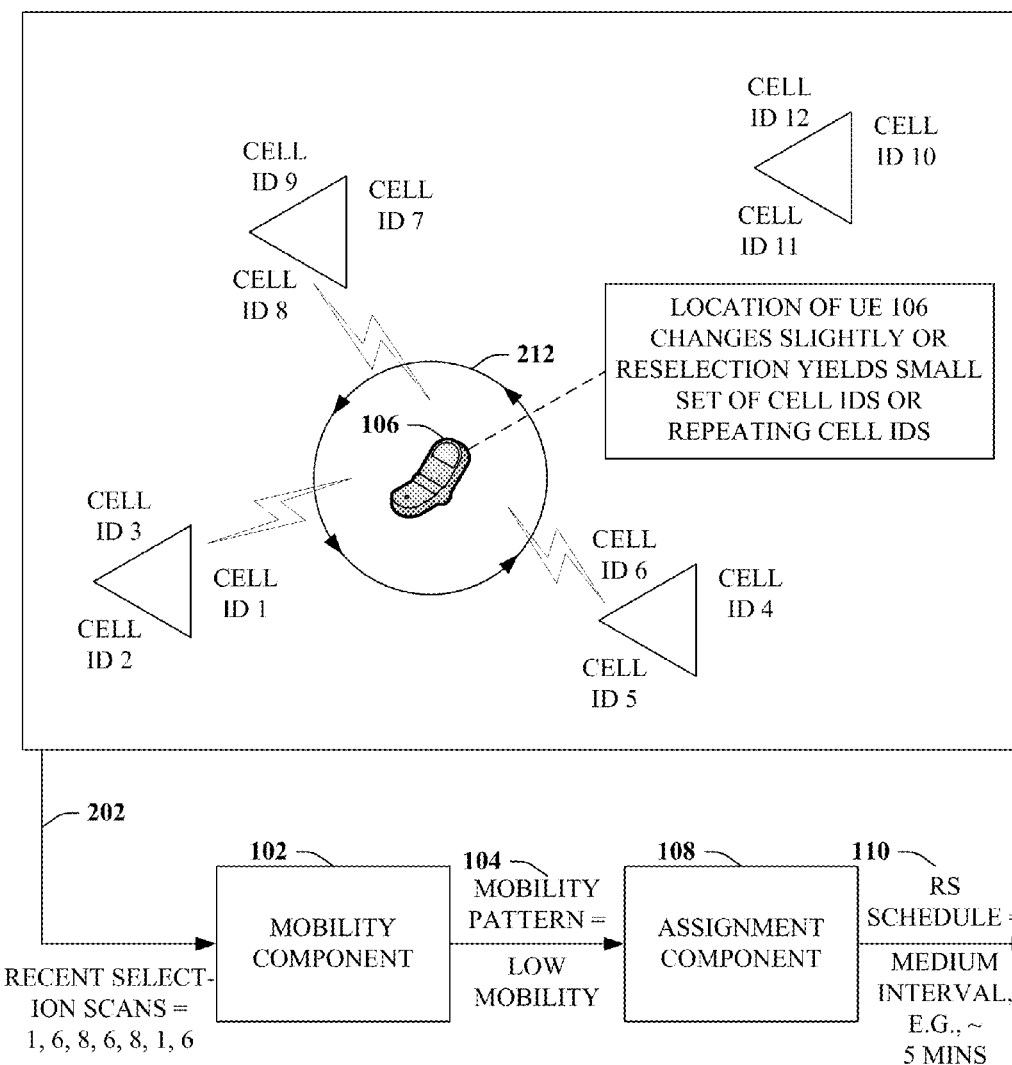
FIG. 2B illustrates a block diagram of a system that depicts an example of processing when a UE is in a low mobility state.
Figure 2C:
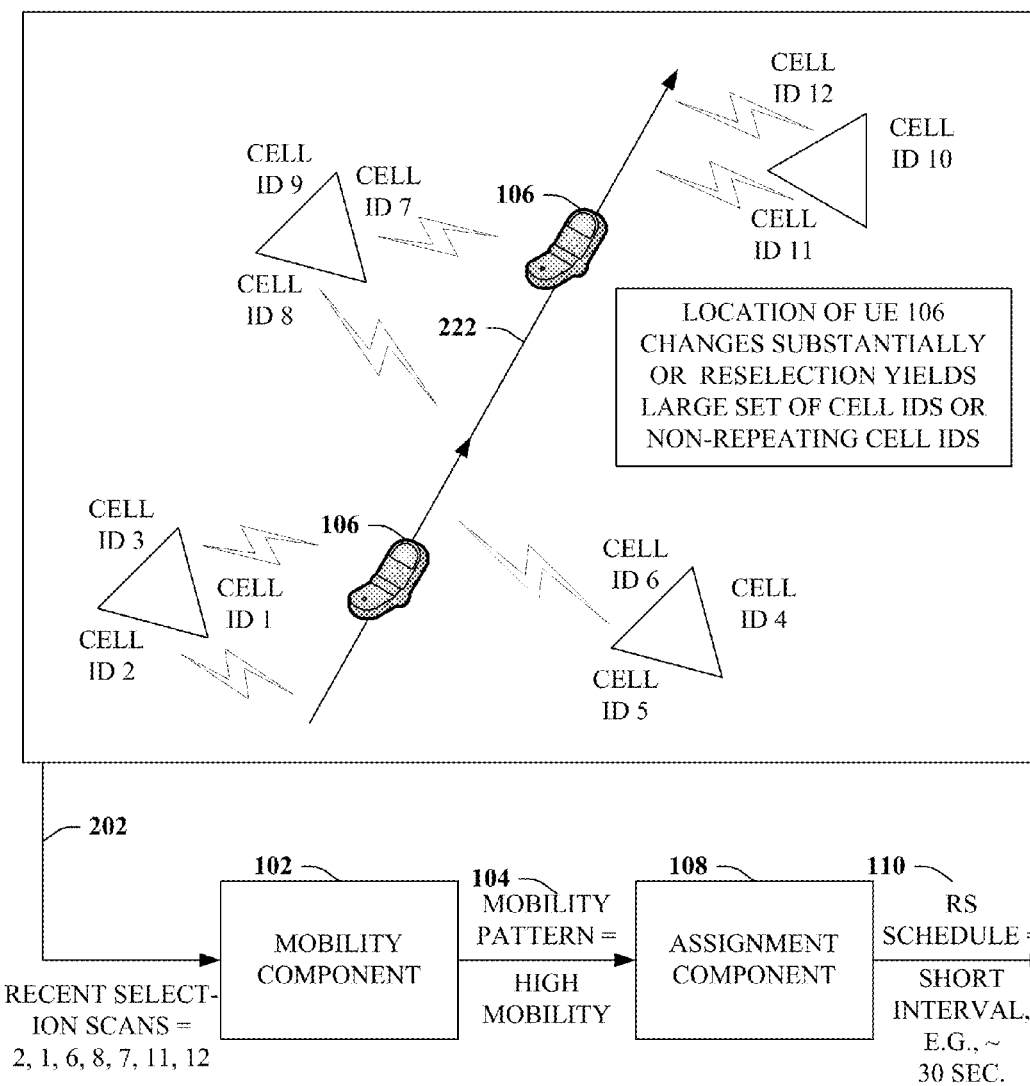
FIG. 2C is a block diagram of a system that provides an example of processing when a UE is in a high mobility state.

Additional features or aspects associated with detecting or defining or classifying various types of movement are provided in connection with FIGS. 2A, 2B, and 2C. However, as a brief introduction, the disclosed subject matter can allow not only for scenarios or categories defined as stationary versus moving, but also various sub-categories of mobility, such as low mobility versus high mobility. Appreciably, various additional scales or categories can be employed, with varying degrees or ranks of mobility (e.g., a scale of 1 to 10), however, for the sake of simplicity, the remainder of this document deals explicitly with three classifications: stationary, low mobility, and high mobility, while one of ordinary skill in the art can appreciated that such can be readily extended to handle additional classifications or further granularity.

Accordingly, when UE 106 is moving, low mobility can be distinguished from high mobility based upon, e.g., a changing reselection pattern versus a fixed reselection pattern. One reason to distinguish between low and high mobility UE states is that it is possible for stationary or relatively slow moving UE to still reselect between different cell IDs occasionally. For instance, triggers for reselection by slow moving or stationary UE (e.g., based on pseudo-mobility) can include traffic load variations, slow fading caused by nearby moving objects (e.g., vehicles), or service areas with many overlapping sector carriers. In these cases, as well as other, the service environment is not necessarily changing enough to justify frequent scanning at a level consistent with actual high mobility, yet current 3GPP specifications would imply just that.

In other words, the UE should identify (or be notified of) the difference between actual high speed mobility and the aforementioned pseudo mobility or a low mobility state. For technologies with relatively narrow bandwidth broadcast control channels, Doppler shift may be used to predict speed, potentially in connection with other aspects discussed herein. However, Doppler shift may not work well for wideband technologies and may also be rendered inaccurate due to reflective objects moving around stationary or slow moving UE. As a second example, Global Positioning System (GPS) can be used, both of which are further discussed in connection with FIG. 3. However, it should be appreciated that while either GPS or Doppler shift can be employed for speed detection, such requires additional power consumption for the UE as well as application specific hardware/software, which increase costs and incurs higher resource consumption. Accordingly, neither of these speed detection techniques is necessary for determining and/or designating the speed of UE 106.

However, accurate differentiation between degrees of mobility can be accomplished by looking at cell ID change patterns, which can be exemplified by current mobility pattern 104. For instance, if UE 106 is reselecting between the same, say, 3 cell IDs for a relatively long period of time, it is possible that UE 106 is in a relatively fixed location which is served by cells with overlapping coverage areas. In this case, UE 106 is not moving (or not much), but rather it can be view that the environment around UE 106 is. Additionally or alternatively, it is likewise possible that UE 106 is merely moving very slowly or to very common and/or local sites. Such UE 106 can be categorized as slow moving or low mobility. On the other hand, if the reselection pattern is not repetitive and different cell ID are used each time or in most cases, then UE 106 is likely moving past many cell sites and may be considered fast moving or classified as high mobility.

Appreciably, as detailed herein, different scanning treatment can be assigned to UE 106 as a function of whether UE 106 is categorized as stationary, low mobility, or high mobility. Thus, the aforementioned speed detection techniques can be employed to identify if UE 106 is in a stationary state, a low mobility state, or a high mobility state. Such mobility states can have a different scan interval tuned for the best mix of battery life conservation and optimal network selection. For example, UE 106 in the stationary state may scan every 10-20 minutes or the like. Such a result can maximize battery life. Similarly, UE 106 that is in low mobility state can scan, say, every 5 minutes in order, e.g., to keep up with environmental changes which may affect network selection, while still preserving battery life. Likewise, UE 106 in high mobility state can on the other hand scan, e.g., every 30 seconds in order to make optimal network selections in rapidly changing radio environments. In addition, results of reselection scanning can be displayed on UE 106, such that, e.g., a user can be presented with a listing of available network technologies. The above-mentioned and other features or aspects are further detailed in connection with FIGS. 2A-C.

Turning now to FIG. 2A, system 200 illustrates an example of processing when a UE is in a stationary state. Depicted are four cell sites, each with three primary cells that project coverage for nearby UE, such as UE 106. In this example, mobility component 102 can determine current mobility pattern 104 is classified as stationary when a geographic location of UE 106 remains substantially unchanged for a recent period of time. Appreciably, mobility component 102 can determine or identify that the geographic location of UE 106 remains substantially unchanged for the recent period of time based upon selection of a single cell ID during a defined number of recent selection scans 202 performed by UE 106.

For instance, in this example, mobility component 102 receives a pattern of recent selection scans 202 that indicates "1, 1, 1, 1, 1, 1, 1." Thus, it can be determined that the most recent seven selection scans performed by UE 106 all yielded a selection of cell ID=1. Hence, it can be assumed or inferred that UE 106 is stationary, or at least persists within the coverage area of cell ID 1 exclusively over the recent period of time. Accordingly, current mobility pattern 104 can be characterized by the actual history of recent selection scans 202 or simply as, in this case, stationary. Regardless, based upon current mobility pattern 104, assignment component 108 can set reselection scanning schedule 110 to a long interval between reselection scans when current mobility pattern 104, as in this case, is classified as stationary. The long interval between reselection scans when current mobility pattern 104 is classified as stationary can be, e.g., in the range of approximately 10-20 minutes, or another suitable interval intended to preserve power source supply, while still accounting for potential changes.

It should be appreciated that the recent period of time can be defined by an actual time-based metric (e.g., several minutes, an hour, several hours . . . ) or based upon a number of selection scans (which can occur at defined or calculable intervals). In this example and the remainder of examples, merely for illustrative purposes, the number of selection scans is seven. Employing that number of selection scans, and utilizing a long interval between reselection scans of 10 minutes, then the recent period of time would span 70 minutes. However, it should be understood, that such is merely exemplary and intended to provide a concrete example for UE 106 in a stationary state.

Referring now to FIG. 2B, system 210 depicts an example of processing when a UE is in a low mobility state. In this case, the location of UE 106 can be changing slight (e.g., following path 212) or recent reselection scans yields a small set of cell IDs or that small set includes repeating cell IDs. Appreciably, such a low mobility state need not necessarily require actual physical movement of UE 106 as detailed previously.

Thus, in one or more aspects of the disclosed subject matter, mobility component 102 can determine current mobility pattern 104 to be classified as low mobility when a geographic location of UE 106 (or a local environment of UE 106) changes slightly over a recent period of time. Again, the recent period of time can be based upon a predefined value, based upon a particular number of recent selection scans 202, based upon a mobility state, or combinations thereof.

Mobility component 102 can determine the geographic location of UE 106 (or an associated environment thereof) changes slight over the recent period of time based upon selection of a small number of cell IDs during a defined number of recent selection scans 202 performed by UE 106, wherein the small number of cell IDs are associated with cells with respective coverage areas that are proximal to our overlap one another. Additionally or alternatively, mobility component 102 can determine the geographic location of UE 106 changes slightly over the recent period of time based upon repetitive selection of cell IDs during a defined number of recent selection scans 202 performed by UE 106, wherein the repetitive selection of cell IDs relates to selection of at least a portion of the cell IDs more than once over the defined number of recent selection scans. Put another way, one or more of the cell IDs included in recent selection scans 202 reoccur, suggesting only slight movement or no actual physical movement with overlapping service areas, at least in some instances. As a depicted example, recent reselection scans yields "1, 6, 8, 6, 8, 1, 6," illustrating a relatively small number of cell IDs (e.g., three) that are repeated selected and/or repetitively selected.

Regardless, assignment component 108 can set reselection scanning schedule 110 for UE 106 to a medium interval between reselection scans when current mobility pattern 104 is classified as low mobility. The medium interval between reselection scans when the mobility pattern is classified as low mobility can be, e.g., approximately 5 minutes, or another suitable time in order to balance battery life with potential network presence knowledge.

Referring to FIG. 2C, system 220 provides an example of processing when a UE is in a high mobility state. In this case, the location of UE 106 can be changing substantially (e.g., following path 222) or recent reselection scans can yield a large set of cell IDs or a set that includes non-repeating cell IDs. As depicted traveling along path 222, UE 106 initially selects cell ID 2, then continues out of the coverage area of cell ID 2 into the coverage area of cell ID 1, while selecting cell ID 1, and so on selecting cell IDs 6, 8, 7, 11, and finally 12, which is illustrated in this example of recent selection scans 202.

Based upon such data, mobility component 102 can determine current mobility pattern 104 is classified as high mobility when a geographic location of UE 106 changes substantially over a recent period of time. In one or more aspect of the disclosed subject matter, mobility component 102 can determine the geographic location of UE 106 changes substantially over the recent period of time based upon selection of a large number of cell IDs during a defined number of recent selection scans performed by UE 106, wherein the large number of cell IDs are associated with cells in which at least a portion of respective coverage areas are not proximal to or non-overlapping with other coverage areas. In another aspect, mobility component 102 can determine the geographic location of UE 106 changes substantially over the recent period of time based upon non-repetitive selection of cell IDs during a defined number of recent selection scans performed by UE 106, wherein the non-repetitive selection of cell IDs relates to selection of at least a portion of the cell IDs no more than once over the defined number of recent selection scans.

Hence, assignment component 108 can set reselection scanning schedule 110 for UE 106 to a short interval between reselection scans when current mobility pattern 104 is classified as high mobility. Appreciably, the short interval between reselection scans when the mobility pattern is classified as high mobility can be, e.g., 30 seconds or another suitable interval aimed at discovering services in a high mobility environment, with battery life potentially a secondary consideration.

It should be apparent from the foregoing that the recent period of time can thus be different for stationary, low mobility, or high mobility, or the period of time can be the same, with many more scans occurring when in a high mobility state than when in a stationary state since the scan interval can be much shorter in the former state than in the later.

Figure 3:
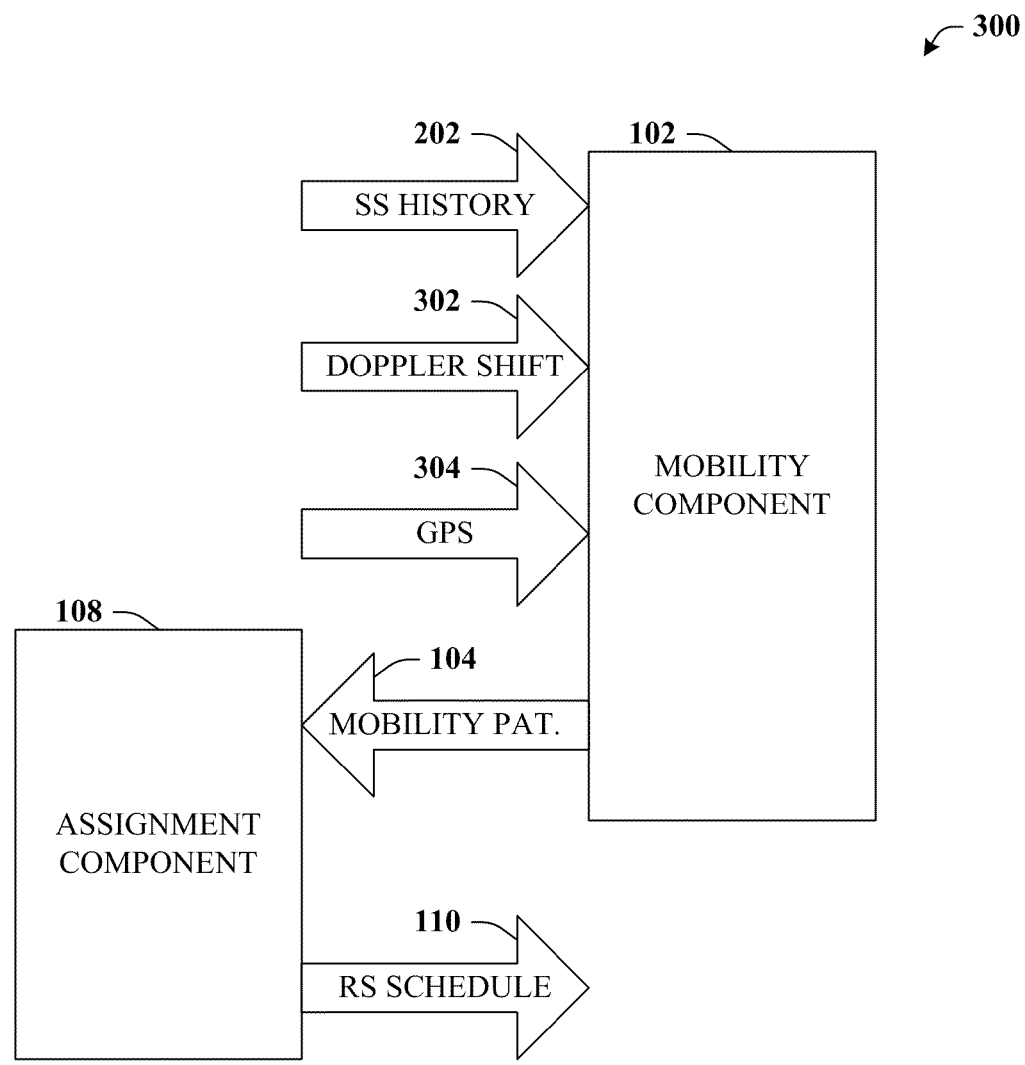
FIG. 3 illustrates a block diagram of a system that can utilize additional indicia associated with mobility of the UE.

Referring now to FIG. 3, system 300 that can utilize additional indicia associated with mobility of the UE is provided. System 300 can include mobility component 102 that can determine current mobility pattern 104 for UE 106, and assignment component 108 that can determine a reselection scanning schedule 110 for UE 106 based upon current mobility pattern 104, as substantially discussed supra. Such can be accomplished by way of recent selection scans, depicted here as selection scan history 202.

Additionally or alternatively, and also as noted above, mobility component 102 can employ at least one of Doppler shift 302 or GPS 304 to determine current mobility pattern 104 or to further refine or aid in determining current mobility pattern 104. Both Doppler shift 302 and GPS data 304 can be identified by a suitably equipped UE 106

Figure 4A:
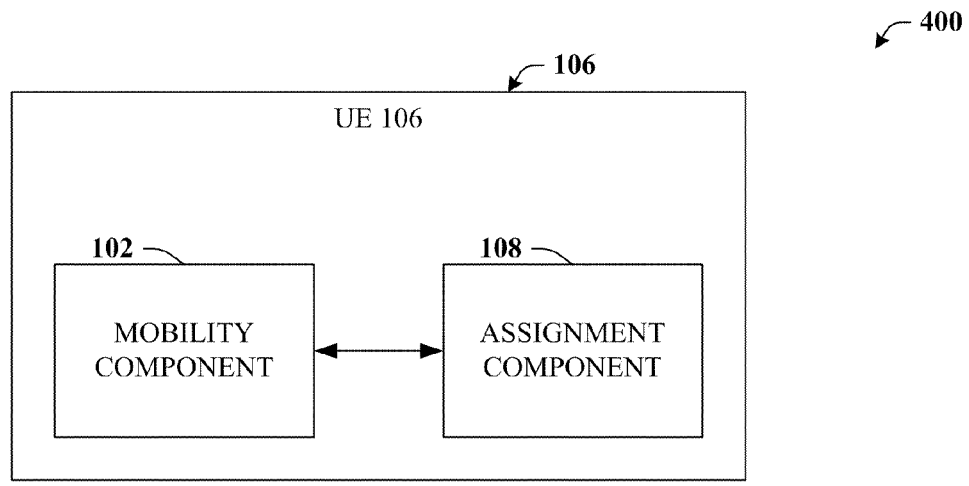
FIG. 4A is a block diagram of a system that depicts a mobile device implementation for the disclosed subject matter.
Figure 4B:
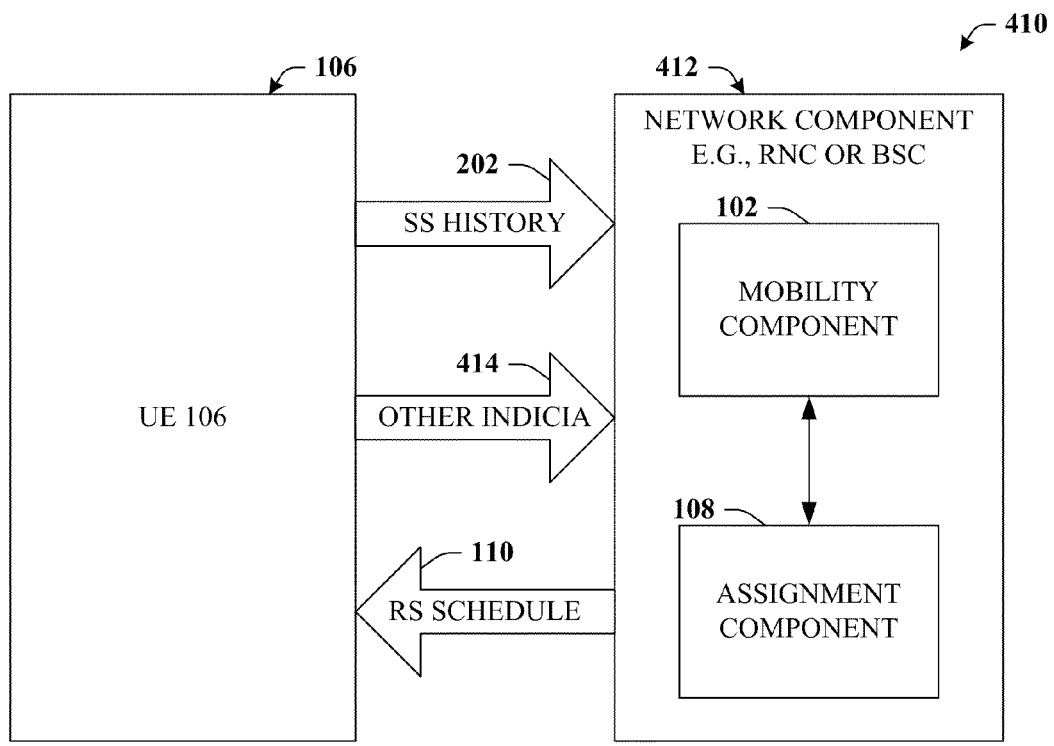
FIG. 4B depicts a block diagram of a system that illustrates a network based implementation of the disclosed subject matter.

With reference now to FIGS. 4A and 4B, systems 400 and 410, respectively, illustrate various implementations for the disclosed subject matter. Turning specifically to FIG. 4A, system 400 depicts a mobile device implementation for the disclosed subject matter. In this implementation, at least one of mobility component 102 or assignment component 108 is included in or operatively coupled to UE 106.

Likewise, referring specifically to FIG. 4B, system 410 illustrates a network based implementation of the disclosed subject matter. For example, at least one of mobility component 102 or assignment component 108 can be included in or operatively coupled to network component 412. Network component 412 can be, e.g., a radio network controller (RNC), a base station controller (BSC), or another suitable component in a wireless communication network. Accordingly, selection scan history 202 as well as other suitable indicia 414 of mobility can be delivered to network component 412, potentially by UE 106. Upon determination, reselection scanning schedule 110 can be transmitted to UE 106, which can employ reselection scanning schedule 110 to set the suitable reselection scanning interval.

Figure 5:
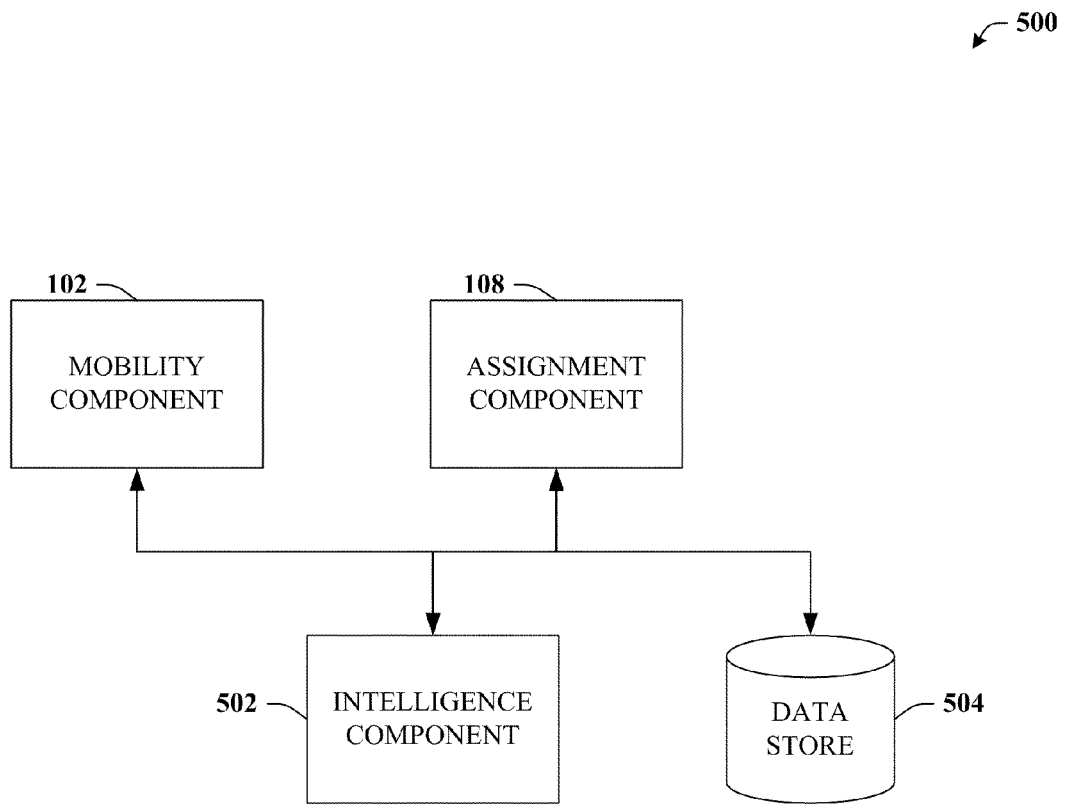
FIG. 5 illustrates a block diagram of a system that can perform or aid with various determinations or inferences.

Now turning to FIG. 5, system 500 that can perform or aid with various determinations or inferences is illustrated. Generally, system 500 can include mobility component 102 and assignment component 108 as substantially described herein. In addition to what has been described, the above-mentioned components can make intelligent determinations or inferences. For example, Bayesian probabilities or confidence measures can be employed or inferences can be based upon machine learning techniques related to historical analysis, feedback, and/or previous determinations or inferences.

For instance, mobility component 102 can intelligently determine or infer current mobility pattern 104 and/or resolve inconsistencies in connection with same, such as, e.g., how to weight various portions of selection scan history 202 when a first portion of cell IDs is repeating, whereas a second portion is not. As one example, mobility component 102 can give more weight based upon order, with the most recent cell ID selections carrying more weight than older cell ID selections. In addition, assignment component 108 can intelligently determine or infer an optimal reselection scanning schedule 110, e.g., optimized to very particular behavior detected or recorded by UE 106 that can be utilized to set reselection scanning schedule 110 to a precise interval not necessarily predefined by broader classifications of stationary, low mobility, or high mobility, but rather, e.g., in between the intervals specified for those categories.

In addition, system 500 can also include intelligence component 502 that can provide for or aid in various inferences or determinations. In particular, in accordance with or in addition to what has been described supra with respect to intelligent determinations or inferences provided by various components described herein, e.g., all or portions of mobility component 102 and assignment component 108. Additionally or alternatively, all or portions of intelligence component 502 can be included in one or more components described herein. Thus, intelligence component 502 can reside in whole or in part either within UE 106 or within a suitable network component 412, depending upon various implementation details.

Moreover, intelligence component 502 will typically have access to all or portions of data sets described herein, such as data store 504. As used herein, data store 504 is intended to be a repository of all or portions of data, data sets, or information described herein or otherwise suitable for use with the described subject matter. Data store 504 can be centralized, either remotely or locally cached, or distributed, potentially across multiple devices and/or schemas. Furthermore, data store 504 can be embodied as substantially any type of memory, including but not limited to volatile or non-volatile, sequential access, structured access, or random access and so on. It should be understood that all or portions of data store 504 can be included in system 100, or can reside in part or entirely remotely from system 100.

Accordingly, in order to provide for or aid in the numerous inferences described herein, intelligence component 502 can examine the entirety or a subset of the data available and can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the disclosed subject matter.

A classifier can be a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naive Bayes, Bayesian networks, decision trees, neural networks, fuzzy logic models, and probabilistic classification models providing different patterns of independence can be employed. Classification as used herein also is inclusive of statistical regression that is utilized to develop models of priority.

FIGS. 6-9 illustrate various methodologies in accordance with the disclosed subject matter. While, for purposes of simplicity of explanation, the methodologies are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the disclosed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 6:
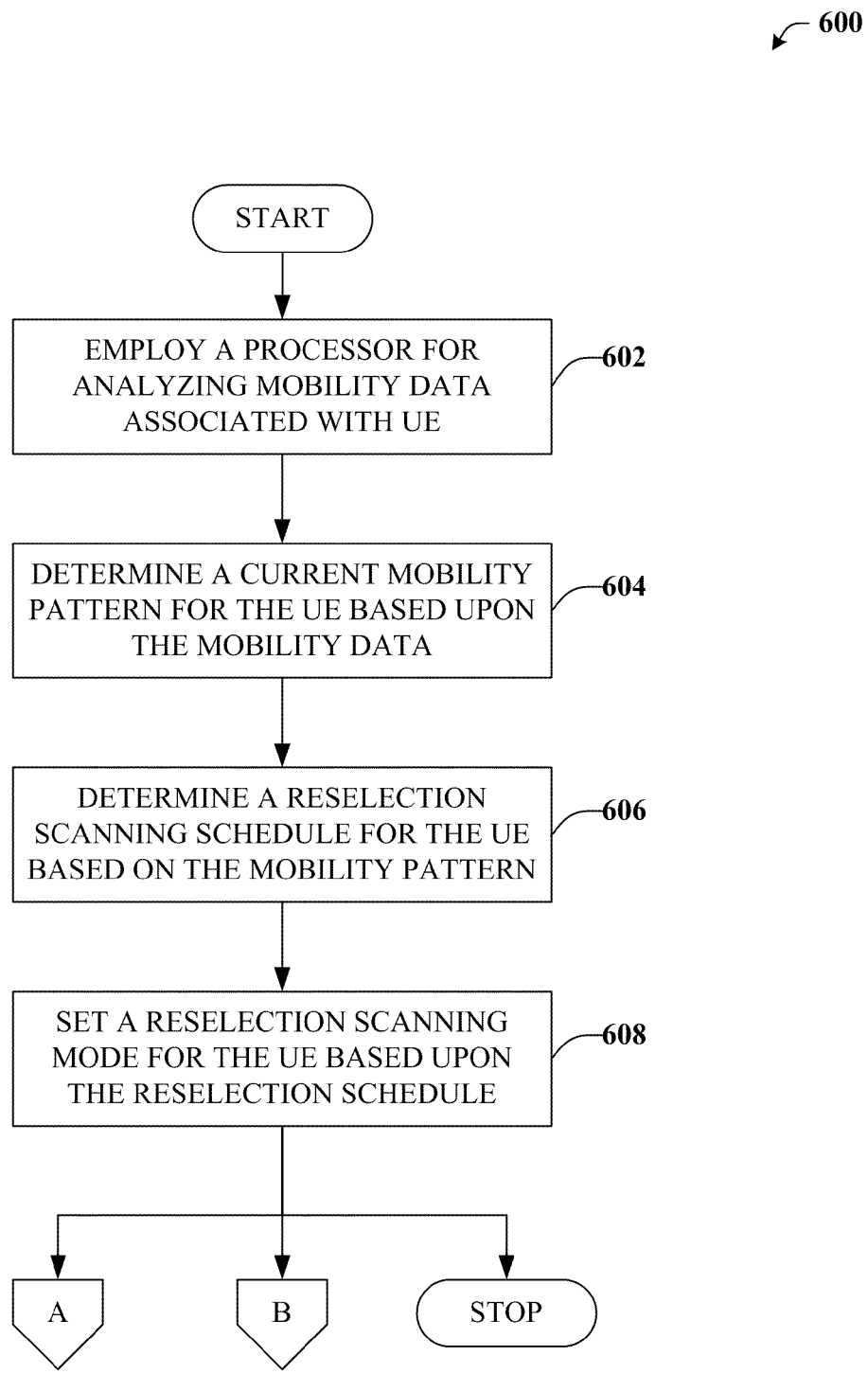
FIG. 6 provides an exemplary flow chart of procedures that define a method for determining a scanning schedule for reselection scanning in connection with a wireless communication service.

Referring now to FIG. 6, exemplary method 600 for determining a scanning schedule for reselection scanning in connection with a wireless communication service is depicted. Generally, at reference numeral 602, a processor can be employed for analyzing mobility data associated with UE served by a wireless communication network. Mobility data can relate actual physical movement of the UE or to pseudo movement, and can be characterized by a history of cell IDs selected in connection with recent reselection scanning operations.

At reference numeral 604, a current mobility pattern for the UE can be determined based upon the mobility data analyzed in connection with reference numeral 602. For example, the current mobility pattern can be characterized as stationary, low mobility, high mobility, or the like. Likewise, at reference numeral 606, a reselection scanning schedule for the UE can be determined based upon the mobility pattern determined at reference numeral 604. Next to be described, at reference numeral 608, a reselection scanning mode can be set for the UE based upon the reselection scanning schedule.

Figure 7:
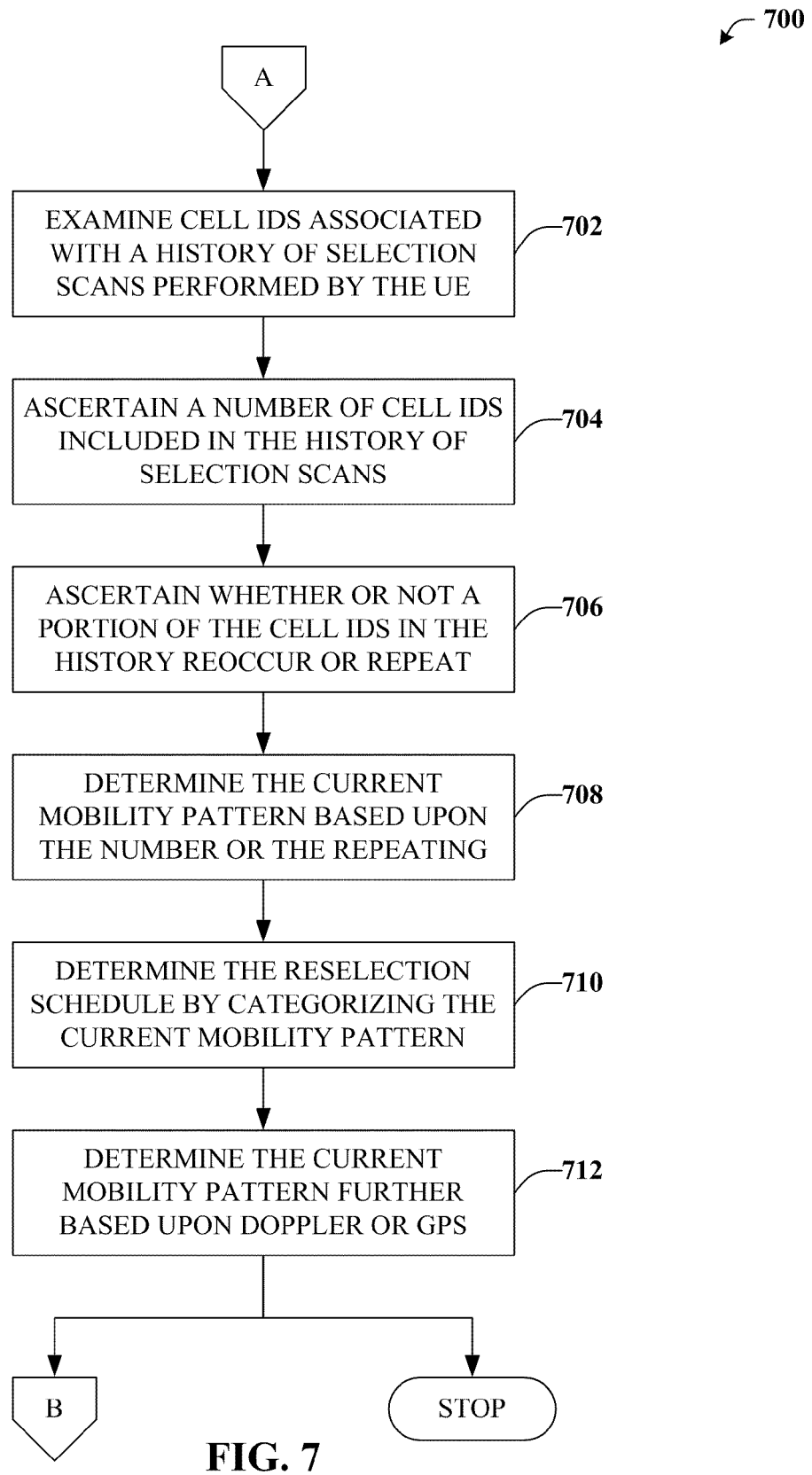
FIG. 7 is an exemplary flow chart of procedures that define a method for providing additional features or aspects in connection with determining or defining a current mobility pattern.

Turning now to FIG. 7, exemplary method 700 for providing additional features or aspects in connection with determining or defining a current mobility pattern is depicted. For example, at reference numeral 702, cell IDs associated with a history of selection scans performed by the UE over a recent period of time can be examined. In other words, the examination can relate to the history of cell IDs selected due to a number of most recent reselection scans performed by the UE.

At reference numeral 704, a number of cell IDs included in the history of reselection scans. For example, supposing the 10 most recent reselection scans yielded selection of 10 unique cells IDs, then the number in this case can be 10. Additionally or alternatively, at reference numeral 706, it can be ascertained whether or not a portion of the cell IDs included in the history of reselection scans reoccur or repeat. Hence, if the 10 most recent reselection scans yielded instead only 6 unique cells (with the other 4 selections being one or more reoccurrence of the 6 unique cell IDs), then the number in this case would be 6, and it could be ascertained that at least one of those 6 unique cell IDs is repeated a total of 4 times.

Next to be described, at reference numeral 708, the current mobility pattern determined in connection with reference numeral 604 can be determined based upon at least one of the number of cell IDs (e.g., an indication of the size of the set of cell IDs in the recent reselection history) ascertained at reference numeral 704, or based upon whether or not the portion is repeated (e.g., an indication of a reoccurrence pattern) ascertained at reference numeral 706.

Moreover, at reference numeral 710 the reselection schedule, such as that determined in connection with reference numeral 606, can be determined by categorizing the current mobility pattern (e.g., determined at reference numeral 604) as one of stationary, low mobility, or high mobility. Such can be in accordance with actual physical movement associated with the UE or based upon pseudo movement. Furthermore, at reference numeral 712, the current mobility pattern can be determined further based upon at least one of a Doppler Effect examination or GPS data, but at a higher power consumption cost and generally only with suitably equipped UE.

Figure 8:
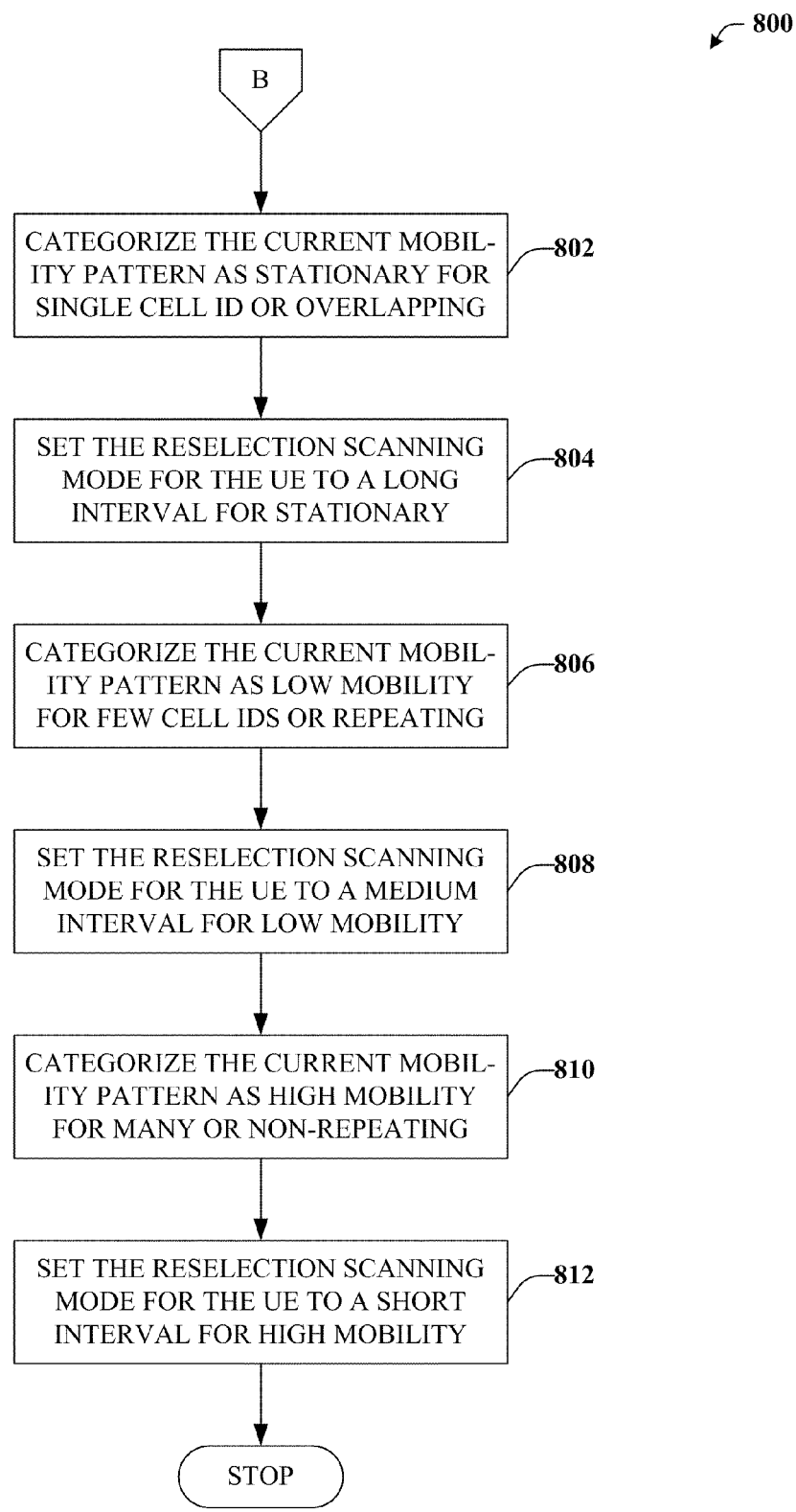
FIG. 8 depicts an exemplary flow chart of procedures defining a method for providing addition features or aspects in connection with categorizing the current mobility pattern or setting the reselection scanning mode.

With reference now to FIG. 8, exemplary method 800 for providing addition features or aspects in connection with categorizing the current mobility pattern or setting the reselection scanning mode is provided. At reference numeral 802, the current mobility pattern can be categorized as stationary when a history of reselection scans for a recent period of time yields only one cell ID or only a few cell IDs associated with cells having physical coverage areas that overlap. In the latter case, it can be likely that reselection is due to pseudo movement. Hence, such type of mobility can be classified as stationary (or as low mobility as discussed supra) since no movement or no substantial movement of the UE is likely occurring. Thus, at reference numeral 804, the reselection scanning mode for the UE (e.g., how often the UE will perform a reselection scan) can be set to a long interval between reselection scans when the current mobility pattern is categorized as stationary.

In addition, at reference numeral 806, the current mobility pattern can be categorized as low mobility when a history of reselection scans for a recent period of time yields a small set of cell IDs in which at least a portion of which are repetitive or that are associated with cells having physical coverage areas that are substantially proximal. For example, if all or a number of the cell IDs included in the history repeat or occur more than once, or such cell IDs are associated with cells with nearby or adjacent coverage areas, then it is likely that the UE is moving only slightly or in along defined or customary paths. Thus, at reference numeral 808, the reselection scanning mode for the UE can be set to a medium interval between reselection scans when the current mobility pattern is categorized as low mobility.

Similarly, at reference numeral 810 the current mobility pattern can be categorized as high mobility when a history of reselection scans for a recent period of time yields a set of cell IDs in which the number of unique cell IDs camped on by the UE is relatively large (e.g., versus a stationary or low mobility designation and in light of a length of the recent period of time or the number of reselection scans utilized to comprise the history), or all or at least a portion of the set of cell IDs do not repeat. In this case, for instance at reference numeral 812, the reselection scanning mode for the UE can be set to a short interval between reselection scans when the current mobility patter is categorized as high mobility.

Figure 9:
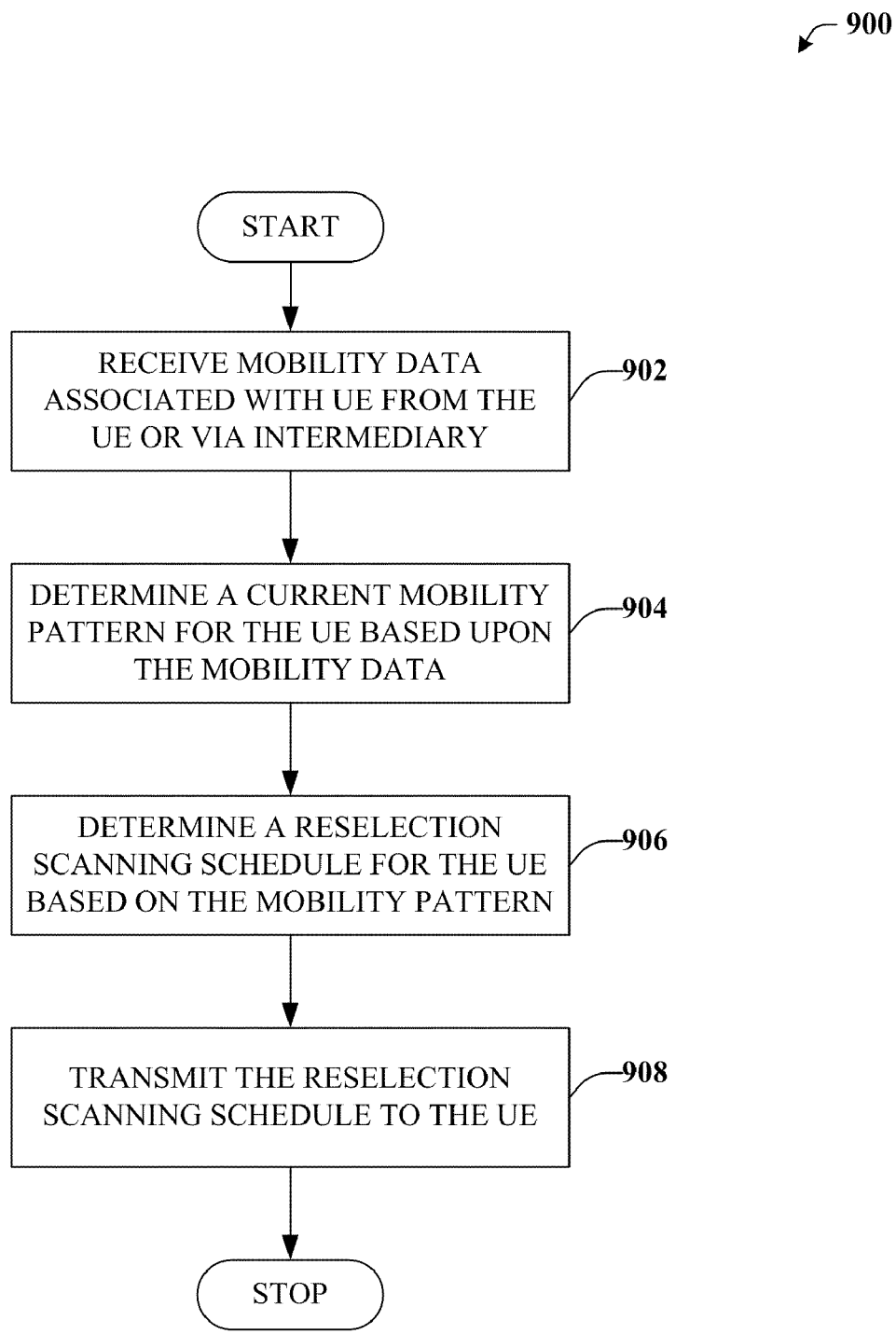
FIG. 9 provides an exemplary flow chart of procedures defining a method for determining a scanning schedule for reselection scanning in connection with a wireless communication network.

Now regarding FIG. 9, exemplary method 900 for determining a scanning schedule for reselection scanning in connection with a wireless communication network is depicted. For example, at reference numeral 902, mobility data associated with UE can be received from the UE or from a component associated with the wireless communication network. In other words, the UE can transmit all the data to be received.

Moreover, at reference numeral 904, a current mobility pattern for the UE can be determined based upon the mobility data received at reference numeral 902. Furthermore, at reference numeral 906, a reselection scanning schedule for the UE can be determined based upon the mobility pattern determined at reference numeral 904. Accordingly, at reference numeral 908, the reselection scanning schedule can be transmitted to the UE, wherein the UE can implement the reselection scanning schedule and/or set a reselection scanning interval appropriately.

Figure 10:
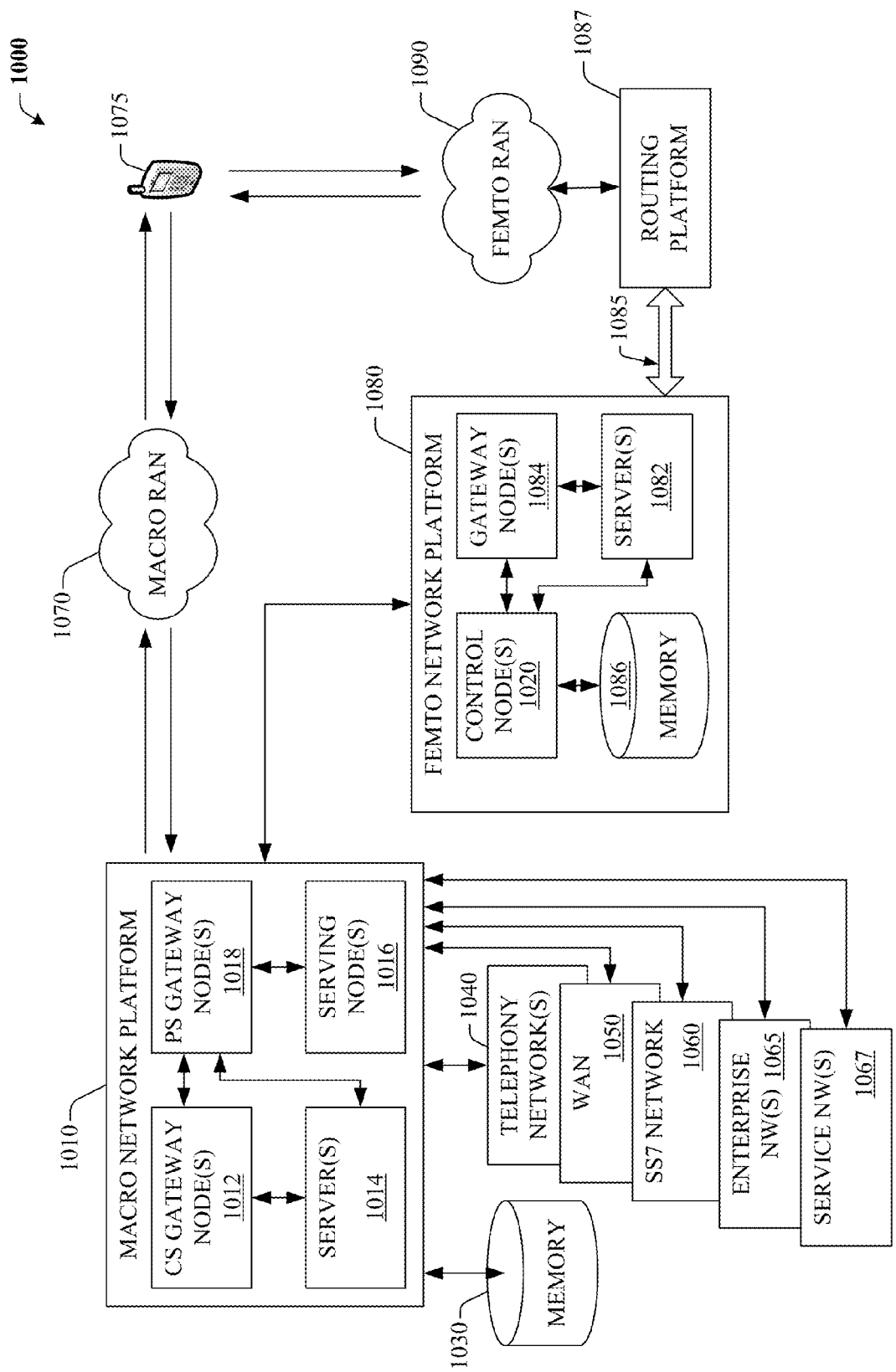
FIG. 10 illustrates an example wireless communication environment with associated components that can enable operation of an enterprise network in accordance with aspects described herein.

To provide further context for various aspects of the subject specification, FIG. 10 illustrates an example wireless communication environment 1000, with associated components that can enable operation of a femtocell enterprise network in accordance with aspects described herein. Wireless communication environment 1000 includes two wireless network platforms: (i) A macro network platform 1010 that serves, or facilitates communication) with user equipment 1075 via a macro radio access network (RAN) 1070. It should be appreciated that in cellular wireless technologies (e.g., 4G, 3GPP UMTS, HSPA, 3GPP LTE, 3GPP UMB), macro network platform 1010 is embodied in a Core Network. (ii) A femto network platform 1080, which can provide communication with UE 1075 through a femto RAN 1090, linked to the femto network platform 1080 through a routing platform 102 via backhaul pipe(s) 1085, wherein backhaul pipe(s) are substantially the same a backhaul link 3853 below. It should be appreciated that femto network platform 1080 typically offloads UE 1075 from macro network, once UE 1075 attaches (e.g., through macro-to-femto handover, or via a scan of channel resources in idle mode) to femto RAN.

It is noted that RAN includes base station(s), or access point(s), and its associated electronic circuitry and deployment site(s), in addition to a wireless radio link operated in accordance with the base station(s). Accordingly, macro RAN 1070 can comprise various coverage cells like cell 1205, while femto RAN 1090 can comprise multiple femto access points. As mentioned above, it is to be appreciated that deployment density in femto RAN 1090 is substantially higher than in macro RAN 1070.

Generally, both macro and femto network platforms 1010 and 1080 include components, e.g., nodes, gateways, interfaces, servers, or platforms, that facilitate both packet-switched (PS) (e.g., internet protocol (IP), frame relay, asynchronous transfer mode (ATM)) and circuit-switched (CS) traffic (e.g., voice and data) and control generation for networked wireless communication. In an aspect of the subject innovation, macro network platform 1010 includes CS gateway node(s) 1012 which can interface CS traffic received from legacy networks like telephony network(s) 1040 (e.g., public switched telephone network (PSTN), or public land mobile network (PLMN)) or a SS7 network 1060. Circuit switched gateway 1012 can authorize and authenticate traffic (e.g., voice) arising from such networks. Additionally, CS gateway 1012 can access mobility, or roaming, data generated through SS7 network 1060; for instance, mobility data stored in a VLR, which can reside in memory 1030. Moreover, CS gateway node(s) 1012 interfaces CS-based traffic and signaling and gateway node(s) 1018. As an example, in a 3GPP UMTS network, gateway node(s) 1018 can be embodied in gateway GPRS support node(s) (GGSN).

In addition to receiving and processing CS-switched traffic and signaling, gateway node(s) 1018 can authorize and authenticate PS-based data sessions with served (e.g., through macro RAN) wireless devices. Data sessions can include traffic exchange with networks external to the macro network platform 1010, like wide area network(s) (WANs) 1050; it should be appreciated that local area network(s) (LANs) can also be interfaced with macro network platform 1010 through gateway node(s) 1018. Gateway node(s) 1018 generates packet data contexts when a data session is established. To that end, in an aspect, gateway node(s) 1018 can include a tunnel interface (e.g., tunnel termination gateway (TTG) in 3GPP UMTS network(s); not shown) which can facilitate packetized communication with disparate wireless network(s), such as Wi-Fi networks. It should be further appreciated that the packetized communication can include multiple flows that can be generated through server(s) 1014. It is to be noted that in 3GPP UMTS network(s), gateway node(s) 1018 (e.g., GGSN) and tunnel interface (e.g., TTG) comprise a packet data gateway (PDG).

Macro network platform 1010 also includes serving node(s) 1016 that convey the various packetized flows of information or data streams, received through gateway node(s) 1018. As an example, in a 3GPP UMTS network, serving node(s) can be embodied in serving GPRS support node(s) (SGSN).

As indicated above, server(s) 1014 in macro network platform 1010 can execute numerous applications (e.g., location services, online gaming, wireless banking, wireless device management . . . ) that generate multiple disparate packetized data streams or flows, and manage (e.g., schedule, queue, format . . . ) such flows. Such application(s), for example can include add-on features to standard services provided by macro network platform 1010. Data streams can be conveyed to gateway node(s) 1018 for authorization/authentication and initiation of a data session, and to serving node(s) 1016 for communication thereafter. Server(s) 1014 can also effect security (e.g., implement one or more firewalls) of macro network platform 1010 to ensure network's operation and data integrity in addition to authorization and authentication procedures that CS gateway node(s) 1012 and gateway node(s) 1018 can enact. Moreover, server(s) 1014 can provision services from external network(s), e.g., WAN 1050, or Global Positioning System (GPS) network(s) (not shown). It is to be noted that server(s) 1014 can include one or more processor configured to confer at least in part the functionality of macro network platform 1010. To that end, the one or more processor can execute code instructions stored in memory 1030, for example.

In example wireless environment 1000, memory 1030 stores information related to operation of macro network platform 1010. Information can include business data associated with subscribers; market plans and strategies, e.g., promotional campaigns, business partnerships; operational data for mobile devices served through macro network platform; service and privacy policies; end-user service logs for law enforcement; and so forth. Memory 1030 can also store information from at least one of telephony network(s) 1040, WAN(s) 1050, or SS7 network 1060, enterprise NW(s) 1065, or service NW(s) 1067.

Femto gateway node(s) 1084 have substantially the same functionality as PS gateway node(s) 1018. Additionally, femto gateway node(s) 1084 can also include substantially all functionality of serving node(s) 1016. In an aspect, femto gateway node(s) 1084 facilitates handover resolution, e.g., assessment and execution. Further, control node(s) 1020 can receive handover requests and relay them to a handover component (not shown) via gateway node(s) 1084. According to an aspect, control node(s) 1020 can support RNC capabilities.

Server(s) 1082 have substantially the same functionality as described in connection with server(s) 1014. In an aspect, server(s) 1082 can execute multiple application(s) that provide service (e.g., voice and data) to wireless devices served through femto RAN 1090. Server(s) 1082 can also provide security features to femto network platform. In addition, server(s) 1082 can manage (e.g., schedule, queue, format . . . ) substantially all packetized flows (e.g., IP-based, frame relay-based, ATM-based) it generates in addition to data received from macro network platform 1010. It is to be noted that server(s) 1082 can include one or more processor configured to confer at least in part the functionality of macro network platform 1010. To that end, the one or more processor can execute code instructions stored in memory 1086, for example.

Memory 1086 can include information relevant to operation of the various components of femto network platform 1080. For example operational information that can be stored in memory 1086 can comprise, but is not limited to, subscriber information; contracted services; maintenance and service records; femto cell configuration (e.g., devices served through femto RAN 1090; access control lists, or white lists); service policies and specifications; privacy policies; add-on features; and so forth.

It is noted that femto network platform 1080 and macro network platform 1010 can be functionally connected through one or more reference link(s) or reference interface(s). In addition, femto network platform 1080 can be functionally coupled directly (not illustrated) to one or more of external network(s) 1040, 1050, 1060, 1065 or 1067. Reference link(s) or interface(s) can functionally link at least one of gateway node(s) 1084 or server(s) 1086 to the one or more external networks 1040, 1050, 1060, 1065 or 1067.

Figure 11:
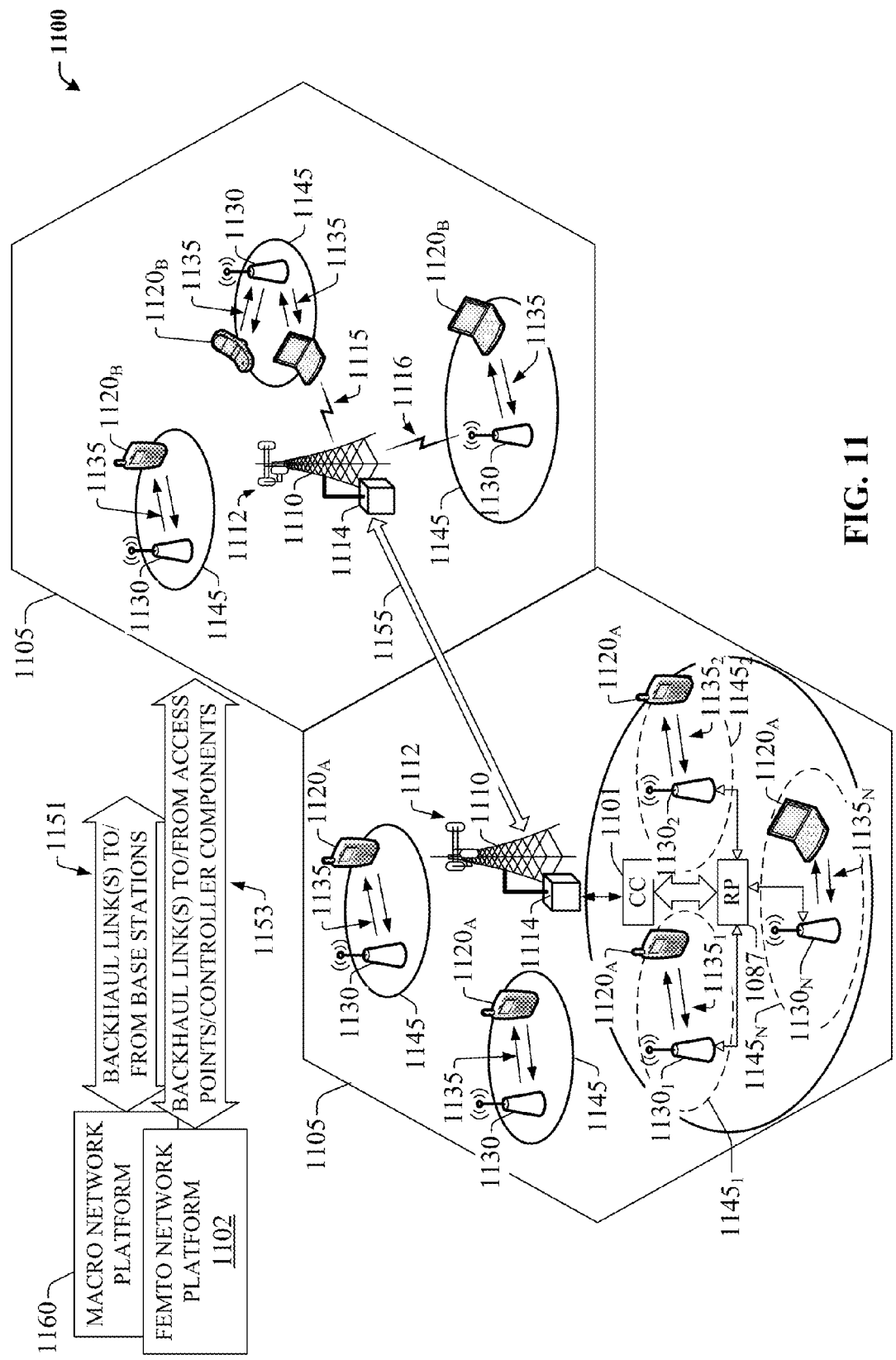
FIG. 11 illustrates a schematic deployment of a macro cell for wireless coverage in accordance with aspects of the subject specification.

FIG. 11 illustrates a wireless environment that includes macro cells and femtocells for wireless coverage in accordance with aspects described herein. In wireless environment 1150, two areas 1105 represent "macro" cell coverage; each macro cell is served by a base station 1110. It can be appreciated that macro cell coverage area 1105 and base station 1110 can include functionality, as more fully described herein, for example, with regard to system 1100. Macro coverage is generally intended to serve mobile wireless devices, like UE $1120_A$, $1120_B$, in outdoors locations. An over-the-air wireless link 115 provides such coverage, the wireless link 1215 comprises a downlink (DL) and an uplink (UL), and utilizes a predetermined band, licensed or unlicensed, of the radio frequency (RF) spectrum. As an example, UE $1120_A$, $1120_E$ can be a 3GPP Universal Mobile Telecommunication System (UMTS) mobile phone. It is noted that a set of base stations, its associated electronics, circuitry or components, base stations control component(s), and wireless links operated in accordance to respective base stations in the set of base stations form a radio access network (RAN). In addition, base station 1110 communicates via backhaul link(s) 1151 with a macro network platform 1160, which in cellular wireless technologies (e.g., 3rd Generation Partnership Project (3GPP) Universal Mobile Telecommunication System (UMTS), Global System for Mobile Communication (GSM)) represents a core network.

In an aspect, macro network platform 1160 controls a set of base stations 1110 that serve either respective cells or a number of sectors within such cells. Base station 1110 comprises radio equipment 1114 for operation in one or more radio technologies, and a set of antennas 1112 (e.g., smart antennas, microwave antennas, satellite dish(es) . . . ) that can serve one or more sectors within a macro cell 1105. It is noted that a set of radio network control node(s), which can be a part of macro network platform; a set of base stations (e.g., Node B 1110) that serve a set of macro cells 1105; electronics, circuitry or components associated with the base stations in the set of base stations; a set of respective OTA wireless links (e.g., links 1115 or 1116) operated in accordance to a radio technology through the base stations; and backhaul link(s) 1155 and 1151 form a macro radio access network (RAN). Macro network platform 1160 also communicates with other base stations (not shown) that serve other cells (not shown). Backhaul link(s) 1151 or 1153 can include a wired backbone link (e.g., optical fiber backbone, twisted-pair line, T1/E1 phone line, a digital subscriber line (DSL) either synchronous or asynchronous, an asymmetric ADSL, or a coaxial cable . . . ) or a wireless (e.g., line-of-sight (LOS) or non-LOS) backbone link. Backhaul pipe(s) 1155 link disparate base stations 1110. According to an aspect, backhaul link 1153 can connect multiple femto access points 1130 and/or controller components (CC) 1101 to the femto network platform 1102. In one example, multiple femto APs can be connected to a routing platform (RP) 1087, which in turn can be connect to a controller component (CC) 1101. Typically, the information from UEs 1120$_A$ can be routed by the RP 102, for example, internally, to another UE 1120$_A$ connected to a disparate femto AP connected to the RP 1087, or, externally, to the femto network platform 1102 via the CC 1101, as discussed in detail supra.

In wireless environment 1150, within one or more macro cell(s) 1105, a set of femtocells 1145 served by respective femto access points (APs) 1130 can be deployed. It can be appreciated that, aspects of the subject innovation are geared to femtocell deployments with substantive femto AP density, e.g., $10^4$-$10^7$ femto APs 1130 per base station 1110. According to an aspect, a set of femto access points 1130$_1$-3730$_N$, with N a natural number, can be functionally connected to a routing platform 1087, which can be functionally coupled to a controller component 1101. The controller component 1101 can be operationally linked to the femto network platform 330 by employing backhaul link(s) 1153. Accordingly, UEs UE 3720$_A$ connected to femto APs 1130$_1$-3830$_N$ can communicate internally within the femto enterprise via the routing platform (RP) 1087 and/or can also communicate with the femto network platform 1102 via the RP 1087, controller component 1101 and the backhaul link(s) 1153. It can be appreciated that although only one femto enterprise is depicted in FIG. 11, multiple femto enterprise networks can be deployed within a macro cell 1105.

It is noted that while various aspects, features, or advantages described herein have been illustrated through femto access point(s) and associated femto coverage, such aspects and features also can be exploited for home access point(s) (HAPs) that provide wireless coverage through substantially any, or any, disparate telecommunication technologies, such as for example Wi-Fi (wireless fidelity) or picocell telecommunication. Additionally, aspects, features, or advantages of the subject innovation can be exploited in substantially any wireless telecommunication, or radio, technology; for example, Wi-Fi, Worldwide Interoperability for Microwave Access (WiMAX), Enhanced General Packet Radio Service (Enhanced GPRS), 3GPP LTE, 3GPP2 UMB, 3GPP UMTS, HSPA, HSDPA, HSUPA, or LTE Advanced. Moreover, substantially all aspects of the subject innovation can include legacy telecommunication technologies.

Figure 12:
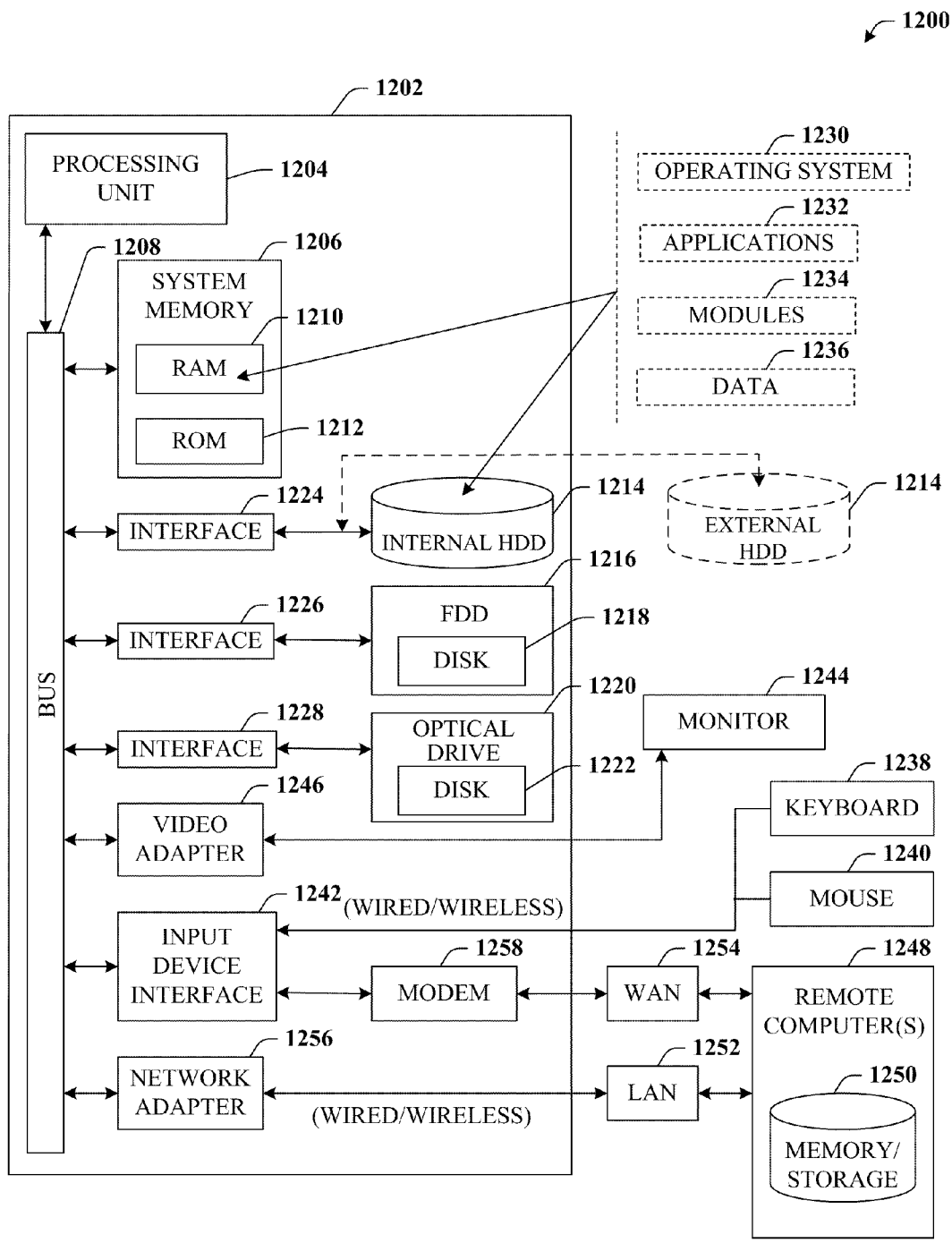
FIG. 12 illustrates a block diagram of a computer operable to execute a portion of the disclosed architecture.

Referring now to FIG. 12, there is illustrated a block diagram of an exemplary computer system operable to execute the disclosed architecture. In order to provide additional context for various aspects of the disclosed subject matter, FIG. 12 and the following discussion are intended to provide a brief, general description of a suitable computing environment 1200 in which the various aspects of the disclosed subject matter can be implemented. Additionally, while the disclosed subject matter described above may be suitable for application in the general context of computer-executable instructions that may run on one or more computers, those skilled in the art will recognize that the disclosed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, micro-processor-based or programmable consumer electronics, and the like, each of which can be operatively coupled to one or more associated devices.

The illustrated aspects of the disclosed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include either volatile or nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 12, the exemplary environment 1200 for implementing various aspects of the disclosed subject matter includes a computer 1202, the computer 1202 including a processing unit 1204, a system memory 1206 and a system bus 1208. The system bus 1208 couples to system components including, but not limited to, the system memory 1206 to the processing unit 1204. The processing unit 1204 can be any of various commercially available processors. Dual microprocessors and other multi-processor architectures may also be employed as the processing unit 1204.

The system bus 1208 can be any of several types of bus structure that may further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during start-up. The RAM 1212 can also include a high-speed RAM such as static RAM for caching data.

The computer 1202 further includes an internal hard disk drive (HDD) 1214 (e.g., EIDE, SATA), which internal hard disk drive 1214 may also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE1394 interface technologies. Other external drive connection technologies are within contemplation of the subject matter disclosed herein.

The drives and their associated computer-readable media provide nonvolatile storage of data, data structures, computer-executable instructions, and so forth. For the computer 1202, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed subject matter.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is appreciated that the disclosed subject matter can be implemented with various commercially available operating systems or combinations of operating systems.

A user can enter commands and information into the computer 1202 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE1394 serial port, a game port, a USB port, an IR interface, etc.

A monitor 1244 or other type of display device is also connected to the system bus 1208 via an interface, such as a video adapter 1246. In addition to the monitor 1244, a computer typically includes other peripheral output devices (not shown), such as speakers, printers, etc.

The computer 1202 may operate in a networked environment using logical connections via wired and/or wireless communications to one or more remote computers, such as a remote computer(s) 1248. The remote computer(s) 1248 can be a workstation, a server computer, a router, a personal computer, a mobile device, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1202 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 via the serial port interface 1242. In a networked environment, program modules depicted relative to the computer 1202, or portions thereof, can be stored in the remote memory/storage device 1250. It will be appreciated that the network connections shown are exemplary and other means of establishing a communications link between the computers can be used.

The computer 1202 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11(a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

Various aspects or features described herein can be implemented as a method, apparatus, or article of manufacture using standard programming and/or engineering techniques. In addition, various aspects disclosed in the subject specification can also be implemented through program modules stored in a memory and executed by a processor, or other combination of hardware and software, or hardware and firmware. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disc (CD), digital versatile disc (DVD), blu-ray disc (BD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the internet or a local area network (LAN). Of course, those skilled in the art will recognize many modifications may be made to this configuration without departing from the scope or spirit of the disclosed subject matter.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system comprising:
    a memory that stores computer-executable instructions; and
    a processor, communicatively coupled to the memory, that facilitates execution of the computer-executable instructions to at least:
        determine a speed of user equipment associated with a wireless communications network based upon historical data representing a history of selection scans performed by the user equipment, wherein the selection scans are scans by the user equipment that select a cell from among available cells associated with the communications network;
        determine a pattern for the user equipment based upon the speed and the historical data; and
        determine a reselection scanning schedule for the user equipment based upon the pattern, wherein the reselection scanning schedule is a schedule for performing a selection scan.

2. The system of claim 1, wherein the processor further facilitates the execution of the computer-executable instructions to classify the pattern as stationary in response to a geographic location of the user equipment remaining substantially unchanged for a period of time.

3. The system of claim 2, wherein the processor further facilitates the execution of the computer-executable instructions to determine that the geographic location of the user equipment has remained substantially unchanged for the period of time based upon a single cell ID having been selected for a defined number of past selection scans performed by the user equipment.

4. The system of claim 2, wherein the processor further facilitates the execution of the computer-executable instructions to set the reselection scanning schedule for the user equipment to a predefined interval between reselection scans in response to the pattern being classified as stationary.

5. The system of claim 4, wherein the predefined interval between the reselection scans is in a range of approximately 10-20 minutes.

6. The system of claim 1, wherein the processor further facilitates the execution of the computer-executable instructions to determine the pattern is classified with a classification of a set of classifications for the user equipment in response to a geographic location of the user equipment changing over a period of time less than a predefined amount of change.

7. The system of claim 6, wherein the processor further facilitates the execution of the computer-executable instructions to determine that the geographic location of the user equipment has changed less than the predefined amount of change over the period of time:
based upon: a defined number of cell IDs having been selected during a first defined number of selection scans performed by the user equipment, wherein the first defined number of cell IDs are associated with cells with respective coverage areas that are proximal to or overlap one another, or
based upon multiple selections of a set of cell IDs during a second defined number of selection scans performed by the user equipment, wherein the multiple selections of the set of cell IDs are determined based on at least a portion of the set of cell IDs being selected more than the second defined number of selection scans.

8. The system of claim 6, wherein the processor further facilitates the execution of the computer-executable instructions to set the reselection scanning schedule for the user equipment to a predefined interval between reselection scans in response to the pattern being classified with the classification.

9. The system of claim 8, wherein the predefined interval between the reselection scans is approximately 5 minutes.

10. The system of claim 1, wherein the processor further facilitates the execution of the computer-executable instructions to determine the pattern is classified with a classification of a set of classifications for the user equipment in response to a geographic location of the user equipment changing over a period of time more than a predefined amount of change.

11. The system of claim 10, wherein the processor further facilitates the execution of the computer-executable instructions to determine the geographic location of the user equipment has changed more than the predefined amount of change over the period of time:
based upon a defined number of cell IDs having been selected during a first defined number of selection scans performed by the user equipment, wherein the first defined number of cell IDs are associated with cells in which at least a portion of respective coverage areas are not proximal to or non-overlapping with other coverage areas, or
based upon a selection of a set of cell IDs during a second defined number of selection scans performed by the user equipment, wherein the selection of the set of cell IDs is determined by at least a portion of the set of cell IDs being selected no more than once over the second defined number of selection scans.

12. The system of claim 10, wherein the processor further facilitates the execution of the computer-executable instructions to set the reselection scanning schedule for the user equipment to a predefined interval between reselection scans in response to the pattern being classified with the classification.

13. The system of claim 12, wherein the predefined interval between the reselection scans is approximately 30 seconds.

14. The system of claim 1, wherein the processor further facilitates the execution of the computer-executable instructions to employ at least one of Doppler shift data or user equipment location data to modify the pattern.

15. The system of claim 1, wherein the processor further facilitates the execution of the computer-executable instructions to present a set of available cells based upon a result of a reselection scan performed by the user equipment.

16. A method, comprising:
analyzing, by a system including at least one processor, data associated with user equipment configured to connect to a wireless communication network;
determining, by the system, a speed of the user equipment based upon historical data including a history of selection scans performed by the user equipment, wherein the selection scans are scans by the user equipment that select a cell from among available cells associated with the communications network;
determining, by the system, a pattern for the user equipment based upon the data and the speed; and
determining, by the system, a reselection scanning schedule for the user equipment based upon the pattern, wherein the reselection scanning schedule is a schedule for performing a selection scan.

17. The method of claim 16, further comprising
determining, by the system, cell IDs associated with the history of selection scans performed by the user equipment over a period of time;
determining, by the system, a number of the cell IDs included in the history of selection scans; and
determining, by the system, that a subset of the cell IDs included in the history of selection scans are duplicates.

18. The method of claim 17, wherein the determining the pattern includes determining the pattern based upon a number of distinct cell IDs included in the historical data.

19. The method of claim 16, further comprising setting, by the system, a reselection scanning mode for the user equipment based upon the reselection scanning schedule, wherein the setting comprises:
setting the reselection scanning mode for the user equipment to a first interval between reselection scans in response to the pattern being categorized as stationary;
setting the reselection scanning mode for the user equipment to a second interval between the reselection scans in response to the pattern being categorized as moving less than a first pre-defined amount of movement; and
setting the reselection scanning mode for the user equipment to a third interval between the reselection scans in response to the pattern being categorized as moving more than a second pre-defined amount of movement.

20. A method, comprising:
receiving, by a system including at least one processor from a user equipment associated with a wireless communication network, data associated with the user equipment;
determining, by the system, a speed of the user equipment based upon a historical data representing a history of selection scans performed by the user equipment, wherein the selection scans are scans by the user equipment that select a cell from among available cells associated with the communications network;
determining, by the system, a pattern for the user equipment based upon the data;
determining, by the system, a reselection scanning schedule for the user equipment based upon the pattern, wherein the reselection scanning schedule is a schedule for performing a selection scan; and
transmitting, by the system, the reselection scanning schedule to the user equipment.

* * * * *